United States Patent [19]

Woods et al.

[11] Patent Number: 4,468,739
[45] Date of Patent: Aug. 28, 1984

[54] COMPUTER OPTIMIZED ADAPTIVE SUSPENSION SYSTEM HAVING COMBINED SHOCK ABSORBER/AIR SPRING UNIT

[76] Inventors: Lonnie K. Woods, 2222 Lindsay Michelle, Alpine, Calif. 92071; James M. Hamilton, 22 Clover, Irvine, Calif. 92714

[21] Appl. No.: 352,239

[22] Filed: Feb. 25, 1982

Related U.S. Application Data

[63] Continuation-in-part of Ser. No. 322,200, Nov. 17, 1981, abandoned.

[51] Int. Cl.³ .............................................. B60G 9/00
[52] U.S. Cl. ..................................... 364/424; 280/707; 280/714; 267/64.15; 267/64.16
[58] Field of Search .......................... 267/64.15, 64.16; 280/707, 714; 364/424

[56] References Cited

U.S. PATENT DOCUMENTS

| | | | |
|---|---|---|---|
| 2,247,749 | 7/1941 | Venel | 280/124 |
| 2,967,062 | 1/1961 | Avigdor | 280/112 |
| 2,973,969 | 3/1961 | Thall | 280/124 |
| 2,993,705 | 7/1961 | Avigdor | 280/112 |
| 3,124,368 | 3/1964 | Corley et al. | 280/6 |
| 3,321,210 | 5/1967 | Delchev | 280/6 |
| 3,502,347 | 12/1967 | Busignies | 280/124 |
| 3,574,352 | 4/1971 | Elliott | 267/64.16 X |
| 3,584,893 | 6/1971 | Tuczek et al. | 280/124 |
| 3,606,635 | 9/1971 | Strong | 280/6 H |
| 3,608,925 | 9/1971 | Murphy | 280/124 |
| 3,666,286 | 5/1972 | Engfer | 280/124 F |
| 3,727,941 | 4/1973 | Ciolli | 280/124 F |
| 3,830,138 | 8/1974 | Joneleit | 280/124 F |
| 3,873,123 | 3/1975 | Joneleit | 280/124 F |
| 3,995,883 | 12/1976 | Glaze | 208/707 |
| 4,017,099 | 4/1977 | Hegel et al. | 280/124 F |
| 4,054,295 | 10/1977 | Elliott | 280/6.1 |
| 4,065,154 | 12/1977 | Glaze | 208/707 |
| 4,076,275 | 2/1978 | Hiruma | 280/124 F |
| 4,084,830 | 4/1978 | Daniel, Jr. et al. | 280/707 |
| 4,105,216 | 8/1978 | Graham et al. | 280/707 |
| 4,162,083 | 7/1979 | Zabler et al. | 280/707 |
| 4,164,664 | 8/1979 | Kasiewicz | 280/707 |
| 4,168,840 | 9/1979 | Graham | 280/707 |
| 4,185,845 | 1/1980 | Misch et al. | 280/707 |
| 4,215,403 | 7/1980 | Pollard | 364/424 |

FOREIGN PATENT DOCUMENTS

1522795 8/1978 United Kingdom.

OTHER PUBLICATIONS

"The Long and Short of Suspension"; pp. 4-7; Motorcyclist, Jul. 1978; Bruce Burness.
"The Suspension System"; pp. 3-8; Monroe Performance Handbook.

*Primary Examiner*—Jerry Smith
*Assistant Examiner*—Allen MacDonald
*Attorney, Agent, or Firm*—Brown & Martin

[57] ABSTRACT

A vehicle suspension system in which a computer controls damping and spring forces to optimize ride and handling characteristics under a wide range of driving conditions. A combined shock absorber/air spring unit is connected between the wheel and frame of a vehicle. The shock absorber includes a hydraulic sensor which provides signals to the computer which are representative of the position of the piston within the shock absorber. The computer utilizes these signals to control compression and rebound hydraulic pressure regulators to produce preprogrammed compression and rebound damping forces that will yield the desired ride and handling. The air spring may be connected in series with the shock absorber for compression and rebound along the same axis. Pressure sensors and air pressure inlet and outlet valves are connected to the computer for adjusting the pressure within the air spring to provide the desired spring rate.

24 Claims, 6 Drawing Figures

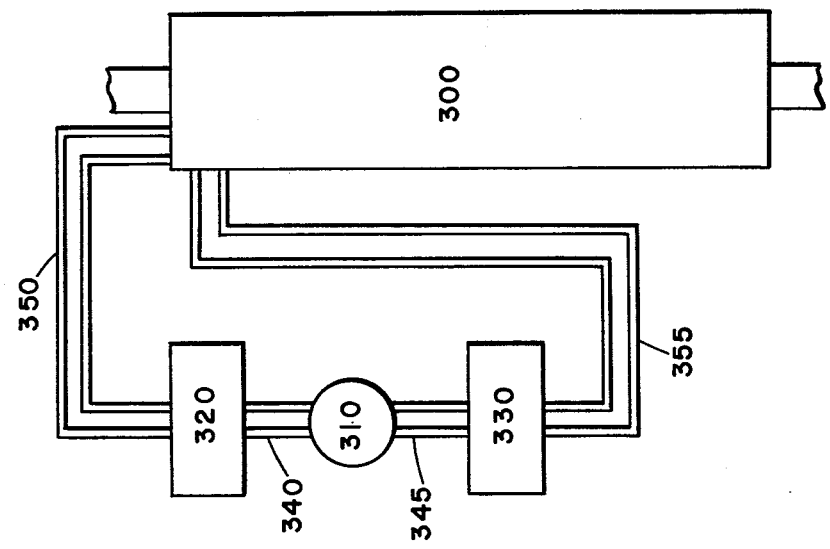
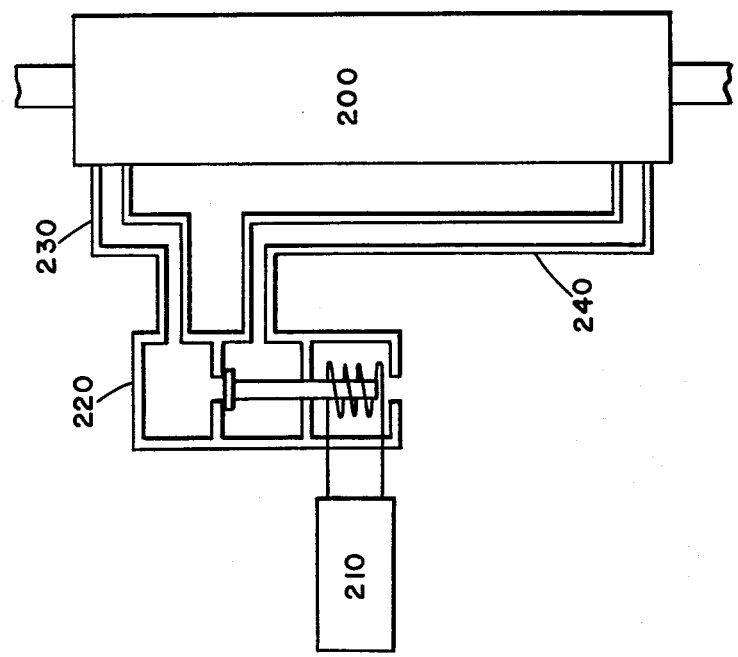
Fig. 6
Fig. 5

COMPUTER OPTIMIZED ADAPTIVE SUSPENSION SYSTEM HAVING COMBINED SHOCK ABSORBER/AIR SPRING UNIT

CROSS-REFERENCE TO RELATED APPLICATION

This application is a continuation-in-part of U.S. patent application Ser. No. 322,200, filed Nov. 17, 1981, now abandoned, having the same title and inventors as this application.

BACKGROUND OF THE INVENTION

The present invention relates to vehicle suspension systems, and more particularly, to a vehicle suspension system in which a computer controls damping and spring forces to optimize ride and handling characteristics under a wide range of driving conditions.

Vehicle suspension systems have heretofore included shock absorbers, springs (coil, leaf, air or torsion bar), axle housings, torque arms, A-frames, anti-roll bars, stabilizers, and so forth. These components have been assembled in various combinations to produce the desired ride and handling characteristics of the vehicle. In a typical suspension system, changes in the spacing between axles and the body/chassis are cushioned by springs. Spring vibration is limited by dampers which are usually called shock absorbers. The shock absorbers dissipate the energy stored in the springs by gradually forcing oil through orifices and valves. The flow resistance encountered by the oil results in compression and rebound forces which control the spring movement. The work done by the oil as it moves through the valves converts energy stored in the springs into heat which is dissipated from the shock absorbers into the surrounding air.

The amount of force exerted by a spring is proportional to how far it is deflected. The amount of force exerted by a hydraulic shock absorber is proportional to the velocity of the piston therein. Modern hydraulic shock absorbers include, for example, a six-stage valve system (three compression stages and three rebound stages) to provide optimum control at various piston velocities.

The goal in a conventional suspension system is to match the resistance or control force of the shock absorbers to the forces generated by their corresponding springs in a manner that will yield the desired ride and handling characteristics. The control forces which conventional shock absorbers exhibit during compression and rebound are determined by their particular bleed valves, blow-off valves, spring discs, blow-off springs or piston restrictions, etc. The damping curves (force versus piston velocity) of conventional shock absorbers are predetermined by their construction and are not adjusted during vehicle travel.

In the past various manual and automatic vehicle leveling systems have been devised for maintaining a predetermined height between the sprung mass of the vehicle (frame and body) and the unsprung mass (wheels, drive train, front axle and rear axle). Many of these systems pump air into, or discharge air from, air springs to raise or lower the vehicle body relative to its wheels. Exemplary vehicle leveling systems are disclosed in U.S. Pat. Nos. 3,574,352; 3,584,893; 3,666,286; 3,830,138; 3,873,123; 4,017,099; 4,054,295; 4,076,275; 4,084,830; 4,162,083; 4,164,664; 4,105,216; 4,168,840; and 4,185,845. The principal object of such vehicle leveling systems is to accommodate variations in vehicle load rather than to actively adjust shock absorbers and springs during vehicle travel to improve ride and handling.

Other vehicle suspension systems have been developed for automatically accommodating dynamic loading effects during vehicle travel. For example, U.S. Pat. Nos. 2,967,062; 2,993,705; and 3,608,925 disclose systems for controlling the roll of a vehicle, for example, during a turn. U.S. Pat. No. 3,995,883 discloses a vehicle suspension system in which a wheel-to-body displacement transducer and an acceleration transducer on the vehicle body produce signals which are utilized to vary the damping forces in the system. U.S. Pat. No. 4,065,154 discloses a vehicle suspension system in which signals from a plurality of wheel axle velocity transducers are utilized in varying the damping forces. British Pat. No. 1,522,795 discloses a vehicle suspension system in which an electrically actuable spool valve controls the application of fluid pressure to a damping control valve.

Other actively controlled vehicle suspension systems are disclosed in U.S. Pat. Nos. 2,247,749; 2,973,969; 3,124,368; 3,321,210; 3,502,347; and 4,215,403.

SUMMARY OF THE INVENTION

The primary object of the present invention is to provide an improved vehicle suspension system which will automatically adjust itself during vehicle travel to provide optimum ride and handling characteristics under a wide variety of driving conditions.

Another object of the present invention is to provide such an automatic vehicle suspension system in which both damping and spring forces may be adjusted.

Another object of the present invention is to provide a combined shock absorber/air spring unit for use in an automatically controlled vehicle suspension system.

Another object of the present invention is to provide a computer optimized adaptive suspension system which will automatically reduce roll, pitch and oscillation, provide improved wheel rebound control and absorb large bumps optimally.

Another object of the present invention is to provide a vehicle suspension system which will insure a smooth, level ride over rough roads.

Still another object of the present invention is to provide a vehicle suspension system which will allow compression and rebound damping to be varied independently.

Still another object of the present invention is to provide a vehicle suspension system which will automatically maintain a selected but adjustable wheel-to-body height for varying loading conditions.

Yet another object of the present invention is to provide a vehicle suspension system capable of varying damping substantially independently of the velocity of the axle relative to the vehicle body.

In the illustrated embodiment, a combined shock absorber/air spring unit is connected between the wheel and frame of a vehicle. It should be understood that the shock absorber or air spring unit can each be separated and either can be used alone with the outer being of conventional design. The shock absorber includes a hydraulic sensor which provides signals to a computer which are representative of the position of the piston within the shock absorber. The computer utilizes these signals to control compression and rebound hydraulic pressure regulators to produce preprogrammed compression and rebound damping forces that will yield the desired ride and handling. The air spring may be connected in series with the shock absorber for compression and rebound along the same axis. Pressure sensors and air pressure inlet and outlet valves are connected to the computer for adjusting the pressure within the air spring to provide the desired spring rate.

The computer can be programmed so that the vehicle will provide an extremely smooth ride on level highways. Simultaneously, the computer may also be programmed so that only limited roll and pitch will be experienced during cornering and/or braking while bumps encountered during cornering and/or braking will be cushioned significantly. Computer programming may also simultaneously provide the vehicle with good off-road handling. Automatic load leveling may also be achieved. In summary, virtually any suspension characteristics can be achieved by appropriate programming. Thus, the suspension system for a given vehicle may provide an optimum set of ride and handling characteristics.

BRIEF DESCRIPTION OF THE DRAWINGS

FIGS. 5 and 6 are schematic diagrams illustrating other variations of the system.

DESCRIPTION OF THE PREFERRED EMBODIMENTS

Figure 1:
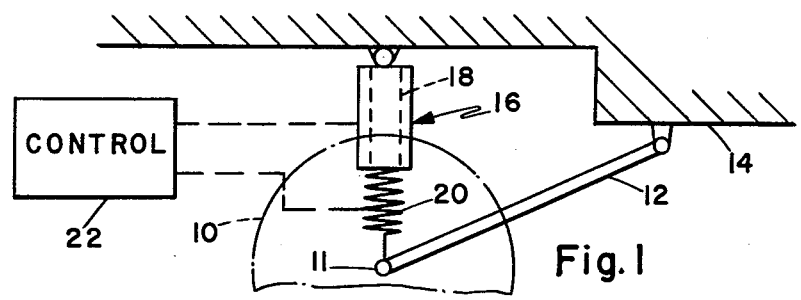
FIG. 1 is a diagrammatic illustration of a preferred embodiment of the suspension system of the present invention.

Referring to FIG. 1, in accordance with the present invention, a wheel 10 is rotatably mounted on an axle 11 which extends from one end of a carrier 12. The other end of the carrier is pivotally mounted to the frame or body 14 of the vehicle. It should be understood that any wheel mounting approach may be used. A suspension unit 16 is connected between the frame 14 and the axle 11. The unit 16 combines an upper shock absorber 18 and a lower air spring 20. The wheel, axle and carrier thus comprise the unsprung portion of the vehicle and the frame and body comprise the sprung portion of the vehicle. The damping forces of the shock absorber 18 and the forces exerted by the air spring 20 are varied by a control circuit 22 in order to optimize the ride and handling characteristics of the vehicle under the wide range of driving conditions.

Figure 2:
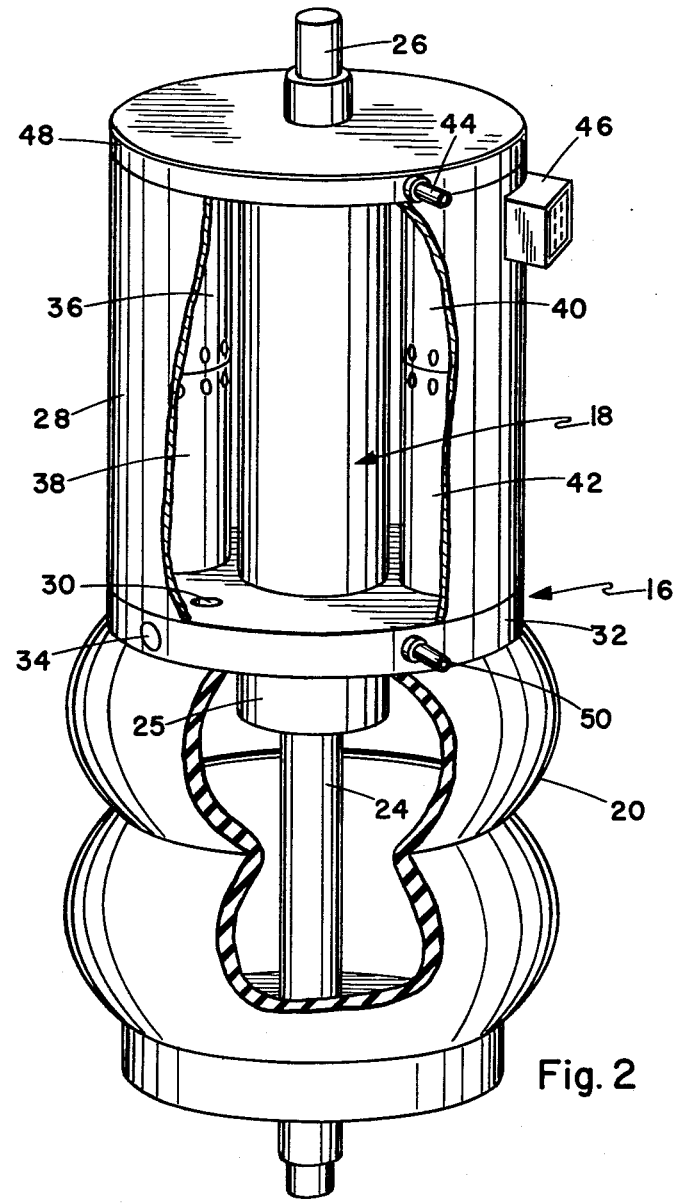
FIG. 2 is a perspective view, with portions broken away, of a preferred embodiment of the combined shock absorber/air spring unit of the suspension system of FIG. 1.

Referring to FIG. 2, the shock absorber 18 and the air spring 20 of the suspension unit are arranged in series for simultaneous compression and rebound along the same longitudinal axis as the wheel of the vehicle moves up and down with respect to the frame. The shock absorber piston rod 24 extends axially through the center of the air spring 20 and is connected to the axle of the wheel. The air spring is made of a flexible bellow. A connecting member 26 extends from the upper end of the shock absorber 18 and is attached to the vehicle frame.

An air tight cylindrical housing 28 concentrically surrounds the shock absorber 18. During compression and rebound of the air spring 20, air flows between the interiors of the air spring and the cylindrical housing 28 through a vent hole 30 in the base 32 of the housing. This air flow helps dissipate heat from the shock absorber 18. The size of the vent hole and air space in the housing 28 will affect the spring constant of the air spring 20. Hydraulic fluid may be filled or drained from the shock absorber 18 by removing a fill plug 34 which normally seals a passage that extends from the shock absorber through the base 32 of the housing.

Within the housing 28 (FIG. 2) are mounted a hydraulic compression pressure regulator 36 and a hydraulic rebound regulator 38. Also mounted within the housing 28 are an air pressure inlet valve 40 and an air pressure outlet valve 42. An air inlet nipple 44 and an electrical connection jack 46 are provided on an upper cap 48 of the housing. An air outlet nipple 50 is provided on the base 32 of the housing 28. A resilient bump stop 25 is provided to protect the suspension on severe bumps.

Figure 3:
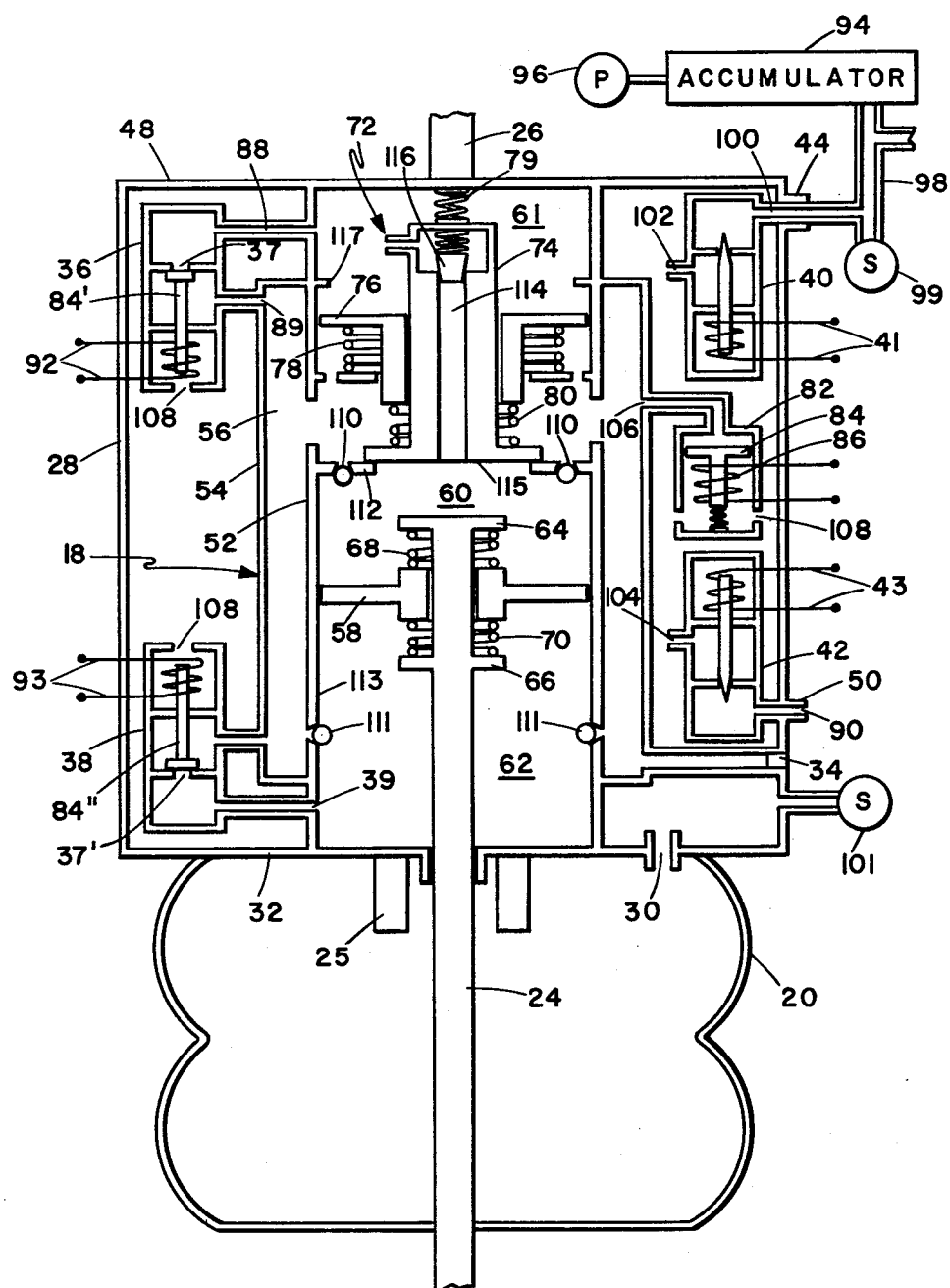
FIG. 3 is a schematic diagram of the combined shock absorber/air spring unit of FIG. 2.

Further details of the preferred embodiment of the suspension unit 16 will now be described by way of reference to the schematic diagram of FIG. 3. The shock absorber 18 includes an inner cylinder 52 and an outer cylinder 54 which surrounds the inner cylinder and defines a reservoir 56. A main piston 58 is connected to the upper end of the piston rod 24 and reciprocates longitudinally within the inner cylinder 52. The piston 58 divides the inner cylinder 52 into an upper chamber 60 and a lower chamber 62. The inner cylinder 52 and the reservoir 56 of the shock absorber and all passages and chambers connected thereto are filled with a quantity of hydraulic fluid. There is no gas in contact with or in the fluid.

The piston 58 is slidable along the upper end of the piston rod 24 between a pair of fixed flanges 64 and 66. The piston 58 is centered between the flanges by springs 68 and 70. This resilient mounting of the main piston 58 relative to the piston rod 24 cushions any abrupt stops or starts of the piston, thereby eliminating the need for bleed valves in the main piston which are found in conventional shock absorbers. No fluid is intentionally allowed to pass between chambers 60 and 62 through piston 58.

The shock absorber 18 is further provided with a compression amplifying valve 72 which is mounted above the upper chamber 60. The function of the valve 72 is described hereafter in greater detail. It includes a central flanged spool 74 and an outer flanged spool 76 which reciprocates about the inner flange spool. The reciprocation of the flanged spools is limited by springs 78, 79 and 80.

A hydraulic sensor 82 communicates with the reservoir 56 of the shock absorber. The hydraulic sensor 82 is not visible in FIG. 2. It includes a piston 84 (FIG. 3) which is moved by fluctuations in the amount of hydraulic fluid within the cylinder 52 due to the volume occupied by the piston rod 24. The hydraulic sensor 82 also includes a transducer such as a linear variable differential transformer 86. This transducer generates signals representative of the position of the piston 84 and therefore the position of the main piston 58.

The compression and rebound pressure regulators 36 and 38 may each comprise linear servo solenoid actuated valves. Signals may be applied to these solenoids to adjust the threshold blow off pressure required to open the passages 37 and 37' held closed by the solenoid pistons 84' and 84". This provides a pressure regulator whereby predetermined pressures within chambers 61 and 62 can be selected by valves 36 and 38, respectively. Fluid flow will be blocked until pressure reaches the preselected threshold pressure, at which time the valve opens and attempts to maintain that pressure.

Similarly, the air pressure inlet and outlet valves 40 and 42 may each comprise solenoid actuated valves. Signals may be applied to these solenoids to meter the flow of air therethrough. The various passages such as 88 and 90 which connect the valves of the aforementioned regulators to their fluid inputs and outputs are formed in the base 32 and cap 48 (FIG. 2) of the cylindrical housing 28. The leads such as 92 of the various solenoids are connected to the control circuit 22 via electrical connector 46. The control circuit applies signals to the solenoids of the regulators 36 and 38 to independently adjust the pressure of the hydraulic fluid in the upper chamber 61 and in the lower chamber 62 to provide predetermined compression and rebound damping forces. The pressure in chamber 61 sets the threshold pressure in chamber 60 by way of the pressure amplifying valve 72 to be described later.

The function of the air pressure inlet and outlet valves 40 and 42 is to adjust the air pressure within the air spring 20. The control circuit applies signals to the solenoids of these valves to meter the flow of air into and out of the housing 28. This also adjusts the air pressure within the air spring 20 since the air can flow from within the housing 28 and into the air spring through the vent hole 30. The air pressure inlet valve 40 is connected to a pressurized gas source, such as an accumulator 94 which is in turn connected to a pump 96. A pipe 98 connects the accumulator with the inlet nipple 44. This nipple communicates with the valve 40 through a passage 100 in the cap 48. Air pressure sensors 99 and 101 generate signals representative of the air pressure within the accumulator 94 and the air spring 20, respectively. The outlet orifice 102 of the valve 40 communicates with the interior of the housing. The inlet orifice 104 of the air pressure outlet valve 42 also communicates with the interior of the housing 28. The passage 90 formed in the base 32 of the housing connects the outlet of the regulator 42 to the outlet nipple 50. The passage 98 communicates the air pressure in accumulator 94 with all of the suspension units associated with the different wheels of the vehicle.

The general operation of the suspension unit 16 (FIGS. 2 and 3) can now be described. When the unit undergoes compression, the air spring 20 is compressed and energy is stored therein. The pressure of the hydraulic fluid in the chamber 60 increases as much as the pressure regulator 36 allows via amplifying valve 72. This determines the compression damping forces. During rebound, the air spring 20 expands releasing the stored energy. The pressure of the hydraulic fluid in the chamber 62 increases as much as the regulator 38 allows. This determines the rebound damping forces.

Hydraulic fluid completely fills the chambers 60 and 62 as well as the reservoir 56, the valves of the regulators 36 and 38 and the passages leading to and from these valves. Hydraulic fluid also fills the passage 106 leading to the hydraulic sensor 82. The cases of the sensor 82 and valves 36 and 38 have vent holes 108 to permit the pressurized air which is within the air spring 20 and the housing 28 to act on one side of the pistons 84, 84' and 84". The hydraulic fluid acts on the other side of the pistons. In this way, the shock absorber adds to the spring rate of the air spring due to its pressure on the fluid within the shock absorber.

During compression and rebound, the hydraulic sensor 82 provides signals to the control circuit indicating the position of the main piston 58 within the shock absorber. The control circuit uses this position information to adjust the regulators 36 and 38 as necessary to achieve predetermined compression and rebound damping forces. During compression, hydraulic fluid is pumped from the upper chamber 60 of the shock absorber, through the amplifying valve 72 via passage 114 or 115 or both, and the valve of the regulator 36 and into the reservoir 56. At the same time, hydraulic fluid from the reservoir is drawn through the check valves 111 and into the lower chamber 62 of the shock absorber. The amount of fluid which is pumped from the upper chamber 60 and the amount of fluid which is pumped into the lower chamber 62 during compression is not equal. This is because of the volume occupied by the portion of the piston rod 24 which is progressively inserted into the lower chamber 62 during compression. The extra hydraulic fluid moves the piston 84 of the sensor downwardly.

During rebound, hydraulic fluid is pumped from the lower chamber 62, through the pressure regulator 38 and into the reservoir 56. Hydraulic fluid is also drawn from the reservoir 56 through check valves 110 positioned in a seat member 112 of the compression amplifying valve 72 and into chamber 60. The piston 84 of the hydraulic sensor 82 now moves upwardly since the volume occupied by the piston rod diminishes. The signals generated by the transducer 86 thus represent the position of the main piston 58 within the shock absorber 18.

The compression pressure regulator 36 cannot adequately control exceedingly low compression forces which may be required in the upper chamber 60, because the orifice 37 is to small for the amount of fluid that must flow from chamber 60 into reservoir 56 during rapid movement of piston 58. Therefore, the compression amplifying valve 72 enables low compression damping forces to be generated, by providing sufficient orifice size for large flow rates at low compression damping forces, as may be desired. In addition, exceedingly high compression forces can be provided by the compression amplifying valve at all flow rates.

The compression amplifying valve 72 operates as follows. As the piston 58 starts to move upward, the pressure of the hydraulic fluid within the chamber 60 increases. Spring 79 keeps spool 74 against orifice 115 for a minimum pressure in chamber 60. Hydraulic fluid is forced through an orifice 114 and check valve 116 in the flanged spool 74 into the upper chamber portion 61. The pressure within the chamber 61 is adjusted by the compression pressure regulator 36. If the pressure in chamber 61 is minimal, the flanged spool 76 rests against the seat 117, and flanged spool 74 rests against the seat 112. As the velocity of the main piston 58 increases, pressure builds up against the flange of the spool 74. The spring 79 determines the blow-off force required to displace the flanged spool 74 upwardly. As the flanged spool 74 blows off, the spring 80 is compressed.

As the regulator 36 increases the pressure in the upper chamber 61, the flanged spool 76 is pushed downwardly against the springs 78 and 80. The force which pushes the flanged spool 76 downwardly is significantly greater than the force which pushes the flanged spool 74 upwardly, if chambers 60 and 61 are at similar pressure. This is because the area of the flange of the spool 76 is significantly greater than that of the spool 74. As the flanged spool 76 is pushed downwardly, the compression of the springs 78 and 80 increases the force required for blow-off of the flanged spool 74 in such a manner as to set the threshold blow-off pressure in chamber 60 via spool 74 to that of chamber 61 plus the preset bias pressure set by spring 79. This establishes a blow-off pressure for spool 74 to that set by pressure regulator 36 plus a small bias set by spring 79. This bias pressure insures that fluid flows through passage 114, opening check valve 116. Check valve 116 insures that the desired pressure in chamber 61 as set by pressure regulator 36 remains during rebound (low pressure in chamber 60).

When the pressure in the chamber 61 pushes the flanged spool 76 down to where spring 80 is completely compressed, the spring 80 no longer functions. Any increased pressure in the chamber 61 must be matched by several times that pressure in the chamber 70 in order to blow-off the flanged spool 74. This facilitates much higher pressure in the chamber 60 than the regulator 36 could produce. Proper selection of the strength of the springs 78, 79 and 80 with respect to one another is required in order to achieve the compression amplifying function.

The rebound pressure regulator doesn't require the amplifying valve because the rebound speeds are more consistent since they deal primarily with the natural frequency of the unsprung mass. This can be adequately controlled by selection of the fixed size of passage 39 in combination with the variable threshold pressure set by pressure regulator 38.

Figure 4:
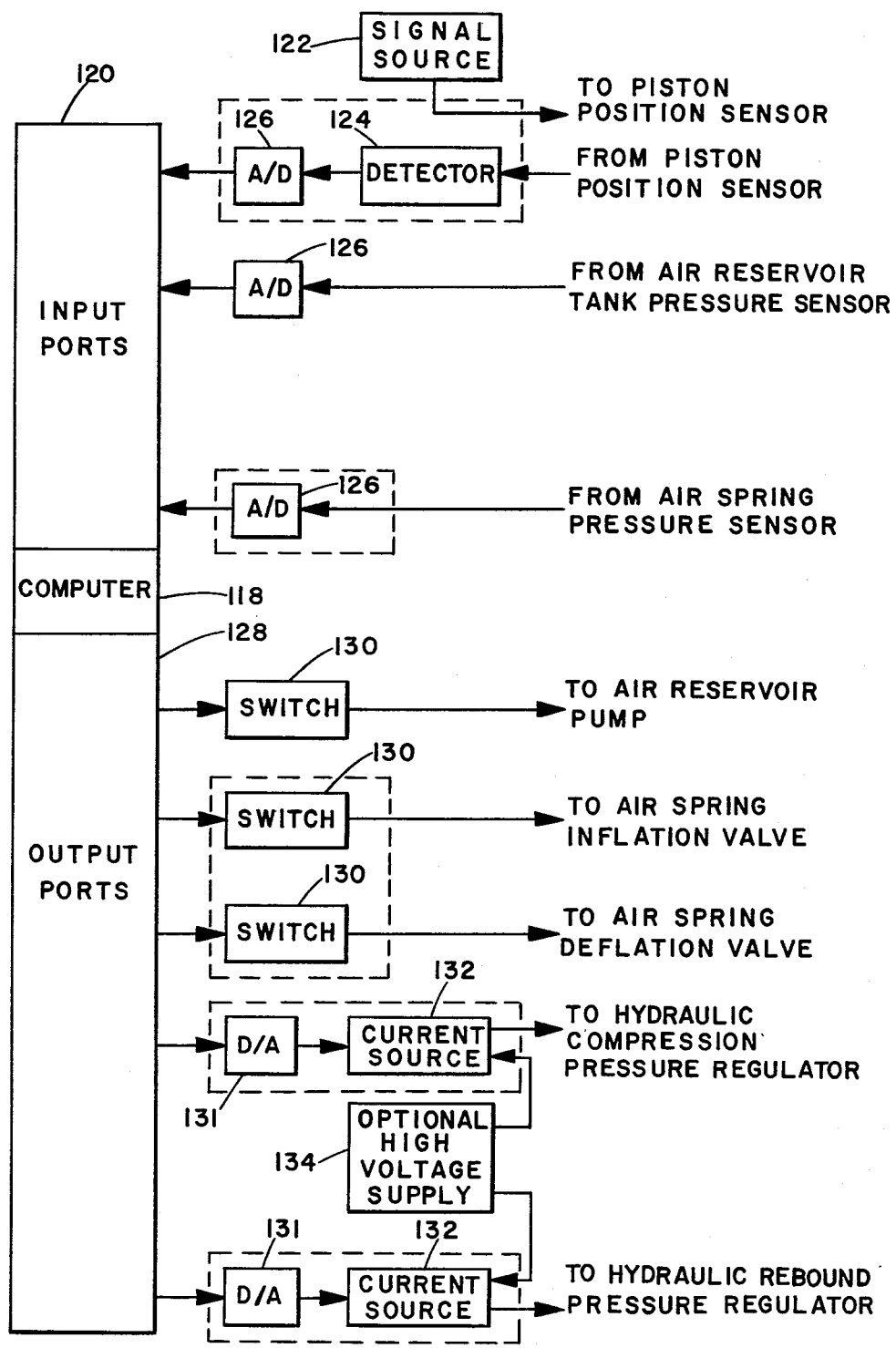
FIG. 4 is a block diagram of one form of the control circuit of the suspension system of FIG. 1.

A preferred embodiment of the control circuit 22 will now be described by way of reference to FIG. 4. This control circuit simultaneously controls all of the suspension units associated with the different wheels of the vehicle. The circuit includes a computer 118 such as a microprocessor having suitable RAM and ROM memories connected thereto for storing computation information and an operational program, respectively. The computer 118 has input ports 120 connected thereto for receiving signals from various transducers within the suspension units. These include the piston position sensors or transducers 82 on each suspension unit, the air pressure sensor 99 and the air pressure sensor 101 on some or all of the suspension units.

Where the hydraulic sensor 82 comprises a transducer, a signal source 122 may be connected to the input of the transducer and the output of the transducer is connected to a detector 124. Analog to digital converters 126 convert the analog signals from the transducers in the suspension unit into digital form before they are input to the computer 118 through the input ports. Using the operational program stored in the ROM of the computer 118, the microprocessor continuously determines the optimum compression and rebound damping forces as well as the optimum spring rate. Commands are sent from the computer 118 to control the pump 96, air pressure inlet and outlet regulators 40 and 42 on some or all of the suspension units, and the compression and rebound regulators 36 and 38 on each suspension unit.

Output ports 128 provide the interface between the computer 118 and the devices which it controls. Digitally controlled switches 130 are utilized to turn the air pump 96 on and off and to open and close the air pressure valves. Digital-to-analog converters 131, current sources 132 and an optional high voltage supply 134 are utilized to generate the signals necessary to control the hydraulic compression and rebound pressure regulators 36 and 38.

Variations of the system are illustrated in FIGS. 5 and 6. FIG. 5 illustrates the simplest possible electrically controllable shock absorber. The shock absorber 200 is that of any conventional design. The variation is that the first stage valving or "bleed orificing" in the piston is set for very rapid pressure build up for improved roll control and performance. A solenoid pressure regulator valve 220 of the preferred embodiment is connected between the compression chamber via conduit 230 and the rebound chamber via conduit 240. A control circuit 210, either manual or automatic, can set the initial first stage blow-off pressure on compression to any level from very low pressure for soft control to very high pressure for stiff control. This is accomplished by allowing the valve 220 to bypass the fluid flow around the first stage orificing within the shock absorber 200 upon compression.

FIG. 6 illustrates a variation that is capable of much higher performance. In FIG. 3, the fluid pressure in chamber 61 is obtained by fluid flow through passage 114 due to the bias pressure generated by the action of spring 79 on spool 74. This flow is limited for soft ride characteristics. If chamber 61 is isolated from the fluid in the shock absorber and connected to an external fluid pressure supply as shown in FIG. 6, then faster response can be obtained. Referring to FIG. 6, the shock absorber 300 is that shown in FIG. 3 only spring 79 is removed and passage 114 is blocked. Passage 88 in FIG. 3 is connected to passage 350 in FIG. 6. Passage 89 in FIG. 3 is connected to passage 355 in FIG. 6. The operation of the system illustrated in FIG. 6 is as follows. The blow-off pressure of spool 74 in FIG. 3 is still set by the pressure in chamber 61 of FIG. 3. However, the fluid pressure in chamber 61 of FIG. 3 is set by valve 36 with the fluid flow into chamber 61 provided through passage 350 from a high pressure fluid accumulation 320 in FIG. 6. The return fluid flow from valve 36 in FIG. 3 goes to a fluid reservoir 330. A pump 310 is then connected between accumulator 320 and reservoir 330 via passages 340 and 345 to recharge the accumulator 320.

It should be obvious that there are many variations of the preferred embodiment that can utilize the pressure regulator solenoid valve and amplifying valve, in different combinations. In particular, the amplifying valve can have spring 80 removed and spools 74 and 76 attached as one unit. The main blow-off orifice 115 would normally be open. When pressure in chamber 61 is increased due to valve 36, the larger area at spool 76 attached directly to spool 74 and the blow-off flange causes the pressure in chamber 60 to reach a multiple of that in chamber 61 at all times for much higher performance.

Having described a preferred embodiment of our invention, it should be apparent to those skilled in the art that our invention may be modified in arrangement and detail. Therefore, the protection afforded our invention should be limited only in accordance with the scope of the following claims.

We claim:

1. A suspension unit for connecting a sprung portion of a vehicle with an unsprung portion, said suspension unit comprising:

spring means;
shock absorber means comprising a first cylinder, a quantity of hydraulic fluid within said first cylinder, and a first piston dividing said first cylinder into upper and lower chambers;
means operatively connecting said spring means and said shock absorber means;
hydraulic sensor means in communication with said first cylinder for generating first signals representative of the position of said first piston within said first cylinder;
compression pressure regulator means coupled to said upper chamber for adjusting the pressure of the hydraulic fluid in said upper chamber during upward movement of said first piston in response to predetermined second signals applied thereto; and
rebound pressure regulator means coupled to said lower chamber for adjusting the pressure of the hydraulic fluid in said lower chamber during downward movement of said first piston in response to predetermined third signals applied thereto.

2. A suspension unit according to claim 1 wherein said spring is an air spring and said suspension unit further comprises:
means adapted to be connected to a source of pressurized air;
air pressure inlet regulator means coupled between said pressurized air source connector means and said air spring for adjusting the air pressure within said air spring in response to predetermined fourth signals applied thereto;
air pressure outlet regulator means coupled between said air spring and the atmosphere for adjusting the air pressure within said air spring in response to predetermined fifth signals applied thereto; and
air pressure sensor means for providing signals representative of the air pressure within said air spring.

3. A suspension unit according to claim 1 wherein said shock absorber means and said spring means are connected in series so that they compress and rebound along the same axis.

4. A suspension unit according to claim 1 wherein said shock absorber means is surrounded by an airtight housing containing pressurized air.

5. A suspension unit according to claim 1 wherein:
said hydraulic sensor means comprises a second cylinder containing a second piston having one side surface acted upon by the hydraulic fluid in communication with said first cylinder and the other side surface acted upon by air surrounding said shock absorber means;
said suspension unit further comprising transducer means operatively coupled with said second piston for generating said first signals.

6. A suspension unit according to claim 1 and further comprising:
compression amplifying valve means subdividing said upper chamber of said first cylinder into first and second portions for generating a hydraulic fluid pressure in said second chamber portion which is a function of the hydraulic fluid pressure generated in said first chamber portion by said compression pressure regulator means and also for providing a predetermined threshold blow-off pressure.

7. A suspension unit according to claim 1 and further comprising means for resiliently mounting said piston on one end of a piston rod which reciprocates within said first cylinder.

8. A suspension unit according to claim 1 wherein said shock absorber means comprises:
a hydraulic fluid reservoir which communicates with said upper and lower chambers through said compression and rebound pressure regulator means; and
check valve means for permitting the hydraulic fluid to flow freely from said reservoir into one of said upper and lower chambers wherein the pressure of the hydraulic fluid is lower than in the other one of said upper and lower chambers.

9. A suspension unit according to claim 1 wherein each said compression and rebound pressure regulator means comprises a solenoid actuated valve that opens in response to a predetermined threshold pressure determined by said second and third signals applied to each respective said solenoid.

10. A suspension unit for connecting a sprung portion of a vehicle with an unsprung portion, said suspension unit comprising:
a hydraulic shock absorber comprising a piston within a cylinder;
an air sprung connected in series with said shock absorber so that they compress and rebound along the same axis;
an airtight housing surrounding said shock absorber and having a vent which communicates with the interior of said air spring;
air pressure regulator means mounted within said airtight housing and connectable to a source of pressurized air for adjusting the air pressure within said air spring;
hydraulic fluid regulator means mounted within said airtight housing for adjusting the compression and rebound damping forces of said shock absorber; and
hydraulic sensor means for generating signals representative of the position of said piston within said cylinder.

11. A suspension unit according to claim 10 wherein the air spring includes a resilient bump stop.

12. A shock absorber comprising:
a cylinder;
a piston rod;
a piston mounted on one end of said piston rod, said piston being reciprocable within said cylinder and defining compression and rebound chambers on opposite sides of said piston; and
valve means for controlling hydraulic fluid flow between said chambers including valving in said piston for controlling hydraulic fluid flow back and forth between said chambers, a first conduit connected to said compression chamber, a second conduit connected to said rebound chamber, and a solenoid valve connecting said first and second conduits;
said solenoid valve normally being closed and being adapted to permit hydraulic flow to flow from said compression chamber to said rebound chamber through said conduits when a predetermined hydraulic fluid threshold blow-off pressure is generated in said compression chamber.

13. A suspension unit for connecting a sprung portion of a vehicle with an unsprung portion, said suspension unit comprising:
spring means;

shock absorber means comprising a first cylinder, a quantity of hydraulic fluid within said first cylinder, and a first piston dividing said first cylinder into upper and lower chambers;

means operatively connecting said spring means and said shock absorber means;

compression pressure regulator means coupled to said upper chamber for adjusting the pressure of the hydraulic fluid in said upper chamber during upward movement of said first piston in response to predetermined first signals applied thereto; and rebound pressure regulator means coupled to said lower chamber for adjusting the pressure of the hydraulic fluid in said lower chamber during downward movement of said first piston in response to predetermined second signals applied thereto; wherein each said compression and rebound pressure regulator means comprises a solenoid actuated valve that opens in response to a predetermined threshold blow-off pressure determined by signals applied to each said solenoid.

14. A suspension unit according to claim 13 and further comprising:

compression amplifying valve means subdividing said upper chamber of said first cylinder into first and second portions for generating a hydraulic fluid pressure in said second chamber portion which is proportional to the hydraulic fluid pressure generated in said first chamber portion by said compression pressure regulator means, said amplifying valve also providing a predetermined threshold blow-off pressure to said compression and rebound pressure solenoid actuated valves.

15. A suspension unit according to claim 14 and further comprising hydraulic sensor means in communication with said first cylinder for generating third signals representative of the position of said first piston within said first cylinder.

16. A suspension unit according to claim 15 wherein said shock absorber means is surrounded by an airtight housing containing pressurized air.

17. A suspension unit according to claim 16 wherein said hydraulic sensor means comprises:

a second cylinder containing a second piston having one side surface acted upon by the hydraulic fluid in communication with said first cylinder and the other side surface acted upon by the air surrounding said shock absorber means;

said suspension further comprising transducer means operatively coupled with said second piston for generating said third signal.

18. A suspension unit according to claim 13 and further comprising hydraulic sensor means in communication with said first cylinder for generating third signals representative of the position of said first piston within said first cylinder.

19. A suspension unit according to claim 13 wherein said shock absorber means comprises:

a hydraulic fluid reservoir which communicates with said upper and lower chambers through said compression and rebound pressure regulator means; and check valve means for permitting the hydraulic fluid to flow freely from said reservoir into one of said upper and lower chambers wherein the pressure of the hydraulic fluid is lower than in the other one of said upper and lower chambers.

20. A suspension unit for connecting a sprung portion of a vehicle with an unsprung portion, said suspension unit comprising:

spring means;

shock absorber means comprising a first cylinder, a quantity of hydraulic fluid within said first cylinder, and a first piston dividing said first cylinder into upper and lower chambers;

compression pressure regulator means coupled to said upper chamber for adjusting the pressure of the hydraulic fluid in said upper chamber during upward movement of said first piston in response to predetermined first signals applied thereto;

rebound pressure regulator means coupled to said lower chamber for adjusting the pressure of the hydraulic fluid in said lower chamber during downward movement of said first piston in response to predetermined second signals applied thereto; and compression amplifying valve means subdividing said upper chamber of said first cylinder into first and second portions for generating a hydraulic fluid pressure in said second chamber portion which is a function of the hydraulic fluid pressure generated in said first chamber portion by said compression pressure regulator means, said amplifying valve also providing a predetermined threshold blow-off pressure.

21. A suspension unit according to claim 20 and further comprising hydraulic sensor means in communication with said first cylinder for generating third signals representative of the position of said first piston within said first cylinder.

22. A suspension unit according to claim 21 wherein said shock absorber means is surrounded by an airtight housing containing pressurized air.

23. A suspension unit according to claim 22 wherein said hydraulic sensor means comprises:

a second cylinder containing a second piston having one side surface acted upon by the hydraulic fluid in communication with said first cylinder and the other side surface acted upon by the air surrounding said shock absorber means;

said suspension unit further comprising transducer means operatively coupled with said second piston for generating said third signal.

24. A suspension unit according to claim 20 wherein said shock absorber means comprises:

a hydraulic fluid reservoir which communicates with said upper and lower chambers through said compression and rebound pressure regulator means; and check valve means for permitting the hydraulic fluid to flow freely from said reservoir into one of said upper and lower chambers wherein the pressure of hydraulic fluid is lower than in the other one of said upper and lower chambers.

* * * * *